Figure 1:
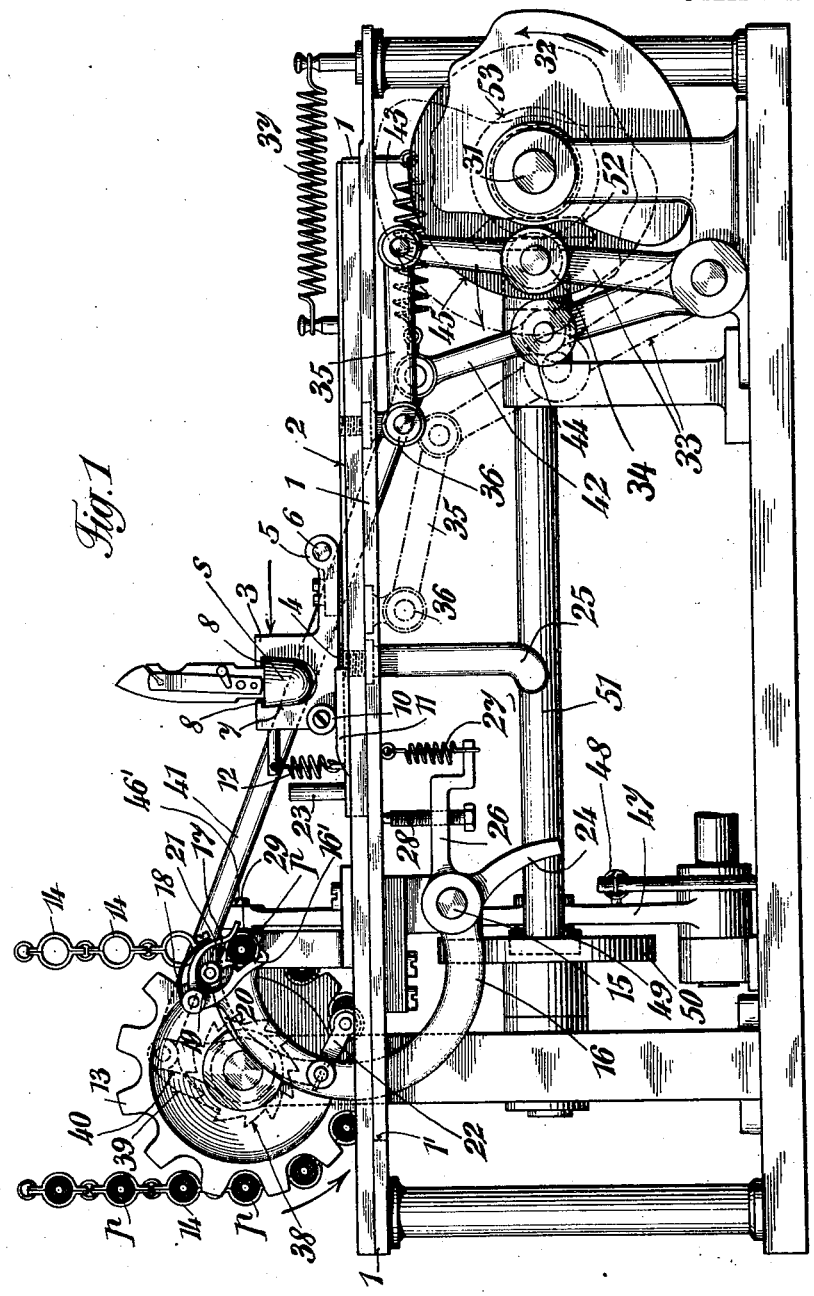

M. SCHOENFELD.
SHUTTLE REPLENISHING MECHANISM.
APPLICATION FILED JAN. 6, 1909.

991,655.

Patented May 9, 1911.

5 SHEETS—SHEET 1.

Witnesses:
Jesse N. Lutton.

Inventor:
Morris Schoenfeld

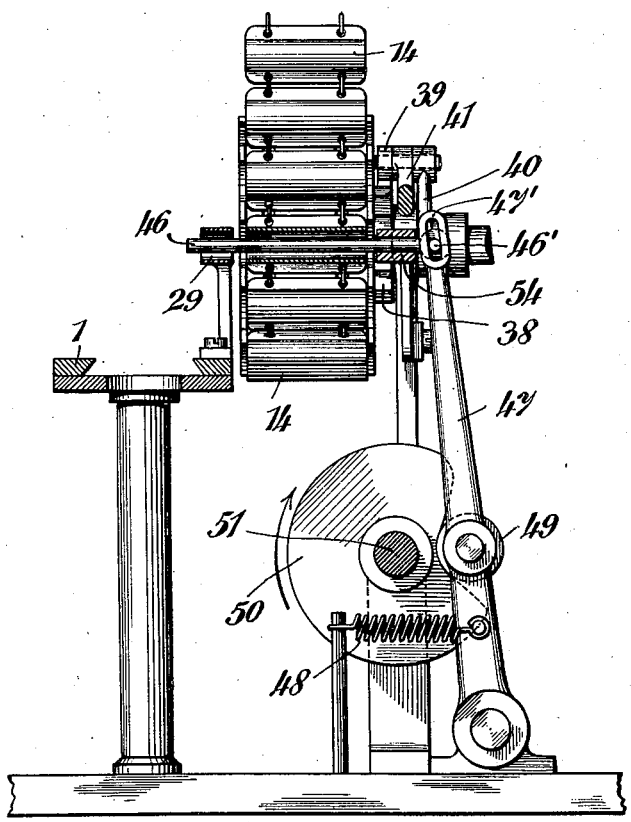

M. SCHOENFELD.
SHUTTLE REPLENISHING MECHANISM.
APPLICATION FILED JAN. 6, 1909.
991,655.
Patented May 9, 1911.
5 SHEETS—SHEET 3.
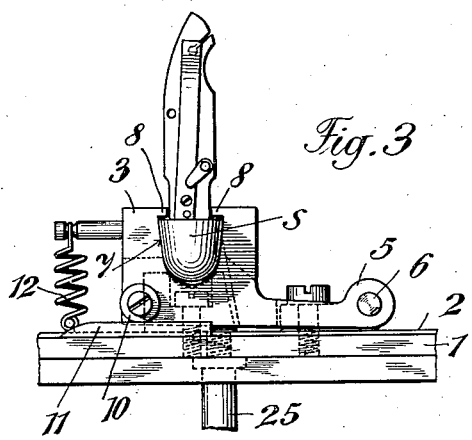
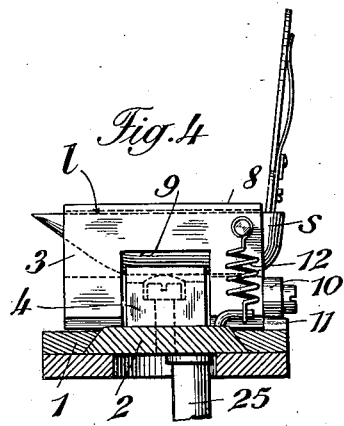
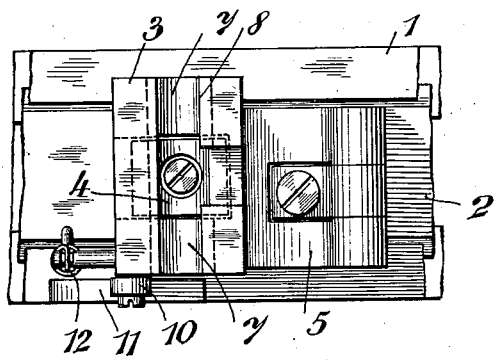
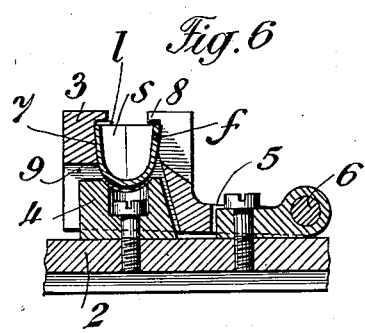
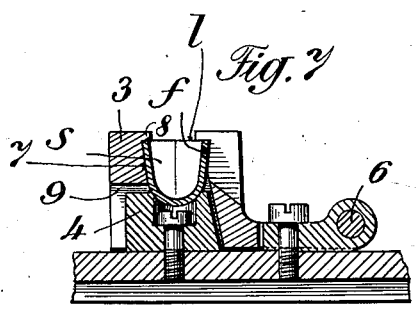
Witnesses:
Jesse N. Lutton
B. V. Sommers
Inventor:
Morris Schoenfeld
by
Henry Otty Jr.
Atty.

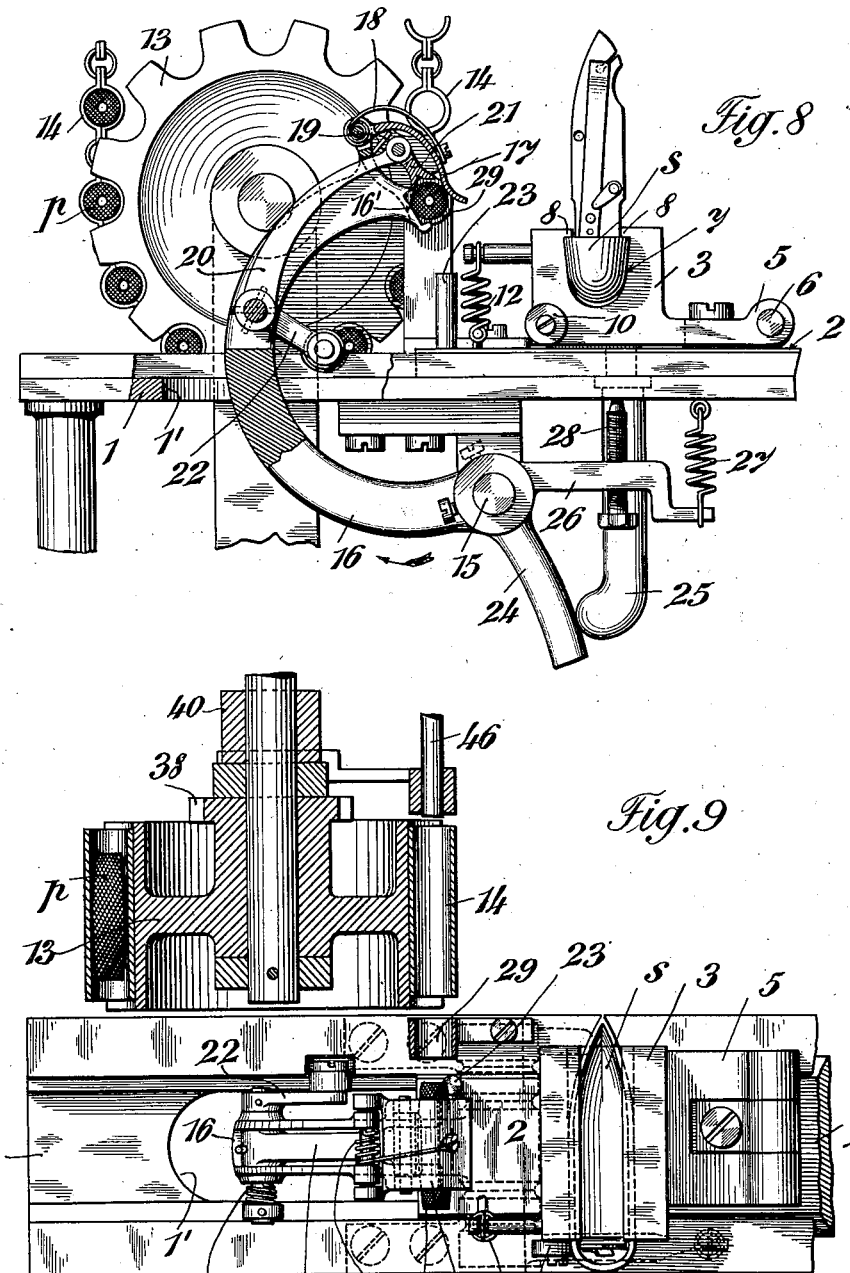

M. SCHOENFELD.
SHUTTLE REPLENISHING MECHANISM.
APPLICATION FILED JAN. 6, 1909.
991,655.
Patented May 9, 1911.
5 SHEETS—SHEET 5.
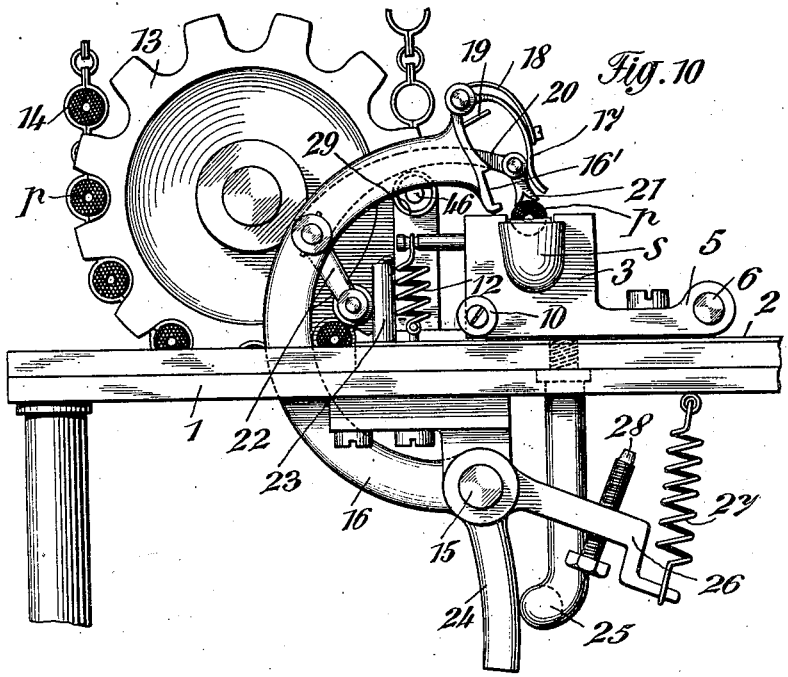
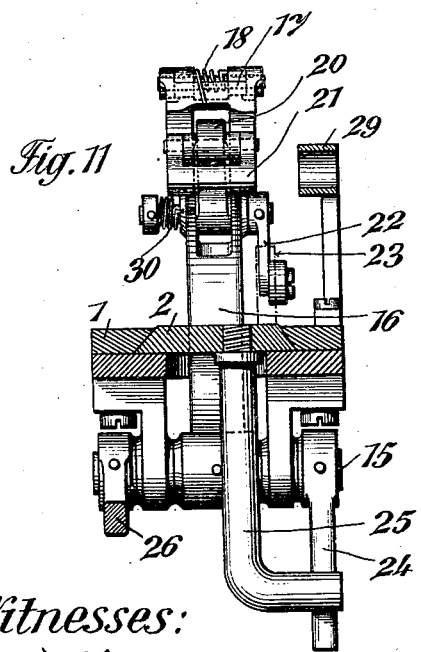
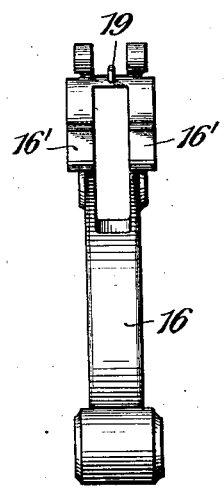
Witnesses:
Jesse N. Lutton
B. V. Sommers
Inventor:
Morris Schoenfeld
by
Henry O'M. Jr.
Atty

UNITED STATES PATENT OFFICE.

MORRIS SCHOENFELD, OF RORSCHACH, SWITZERLAND.

SHUTTLE-REPLENISHING MECHANISM.

991,655.  Specification of Letters Patent.  Patented May 9, 1911.

Application filed January 6, 1909. Serial No. 470,983.

*To all whom it may concern:*

Be it known that I, MORRIS SCHOENFELD, a citizen of the United States of America, residing at Rorschach, Mariabergstrasse, Switzerland, have invented certain new and useful Improvements in Shuttle-Replenishing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to machines for filling the shuttles of embroidery machines, in which the shuttles are jammed in a sliding shuttle-bed in a downward direction, the back of the shuttle serving as determining surface for the height, whereupon the shuttles are brought within the province of an oscillating gripper, which with its pincers seizes the bobbin that has been ejected from its magazine, swings it above the just advanced shuttle, and then inserts it into the shuttle by ejection from the pincers.

One constructional form of the invention is illustrated in the accompanying drawings, in which—

Figure 1 is a front elevation of the machine, and Fig. 2 a cross section through Fig. 1. Fig. 3 is a front elevation of the shuttle-bed drawn on an enlarged scale. Fig. 4 is a side elevation of Fig. 3. Fig. 5 is a plan of Fig. 3, the shuttle being removed. Figs. 6 and 7 are cross-sectional views through the shuttle-bed, showing two different positions of the same. Fig. 8 is a part sectional view of the bobbin-gripper and adjacent parts drawn on an enlarged scale. Fig. 9 is a plan of Fig. 8, partly in horizontal section. Fig. 10 is an elevation of the gripper mechanism and adjacent parts in another position. Fig. 11 is a side elevation and part section through Fig. 10, and Fig. 12 is a detail view, of a portion of the gripper mechanism to be hereinafter referred to.

1 designates a horizontal guideway, in which is movably mounted a slide 2. On the latter there is located the shuttle-bed, consisting of a movable part 3 and a stationary part 4. The part 3 of the shuttle-bed has a forked extension 5 and turns on a pintle 6 rigidly mounted on the slide 2. This part 3 is provided with the usual recess 7 to accommodate a shuttle, and has edges 8 projecting into the recess. The part 3 further presents on its underside a second recess 9, which is partly in connection with the recess 7, and into which there projects the part 4, which is secured to the slide 2 and furnished with a groove (Figs. 3 and 5). At the front end (Figs. 1 and 3) of the part 3 there is mounted a roller 10, and on the guide 1 there is provided in the path of this roller, an elevated track or rail 11.

12 is a tension-spring, one end of which is secured to the part 3 and the other end to the slide 2. The spring 12 has the tendency to draw the movable part 3 down against the part 4.

*s* is a shuttle lying in the shuttle-bed; *f* is the threading-eye and *l* the contact surface of the shuttle.

13 (Fig. 1) designates a sprocket-wheel, with ratchet feed, and with which there engages a bobbin-carrier or magazine, constructed in the form of an endless chain, in well-known manner, and whose links form horizontal cases 14, adapted to accommodate the filled bobbins *p*. On the underside of the guideway 1 there is mounted an axis 15, about which there turns an arm 16, which acts as a gripper to seize the bobbins. The arm 16 projects upwardly through an aperture 1′ in the guideway 1 and is provided at the top, with a recess 16′ to receive a bobbin, and with a cover 17, which is pressed by a spring 18 in the direction of the recess 16′, but is prevented from lying directly against the arm 16 by a pin 19 projecting from the latter (Figs. 8 and 9). The arm 16 is also slotted at the top, and in this slotted part a lever 20 is pivotally mounted, on whose free end a forked piece 21, serving as ejector, is mounted to turn loosely. With the lever 20 there is connected an arm 22, rigidly secured to its axis and provided with a roller, and on the slide 2 there is secured a pin 23 serving as stop for this arm 22. On the axis 15, connected with the arm 16 there is mounted at one end an arm 24 (Fig. 11) for which a stop-pin 25 is provided on the underside of the slide 2; and at the other end there is an arm 26, which is provided with a setscrew 28 (Fig. 1) bearing against the underside of the guide 1, under the influence of a spring 27, whereby the arm 16 is held in its position of rest.

29 is an intermediate guide (Fig. 2), secured to the guide 1 between the arm 16 and the bobbin-carrier 14 (Fig. 2), and 30 is a spring acting on the lever 20 (Fig. 9). The slide 2 receives a reciprocatory motion from a shaft 31, and a cam-disk 32 mounted on the latter, which disk acts on a lever-arm 33 having a roller 34. The lever 33 has jointed to it a connecting-rod 35, which is jointed at 36 to the underside of the guide, and its roller 34 is held against the periphery of the cam-disk 32 by means of a spring 37 secured to the slide. The sprocket-wheel 13 also receives an intermittent motion from the shaft 31. For this purpose a ratchet-wheel 38 is connected with the sprocket-wheel, and between the ratchet teeth there engages a pawl 39, which is mounted on a lever-arm 40, turning loosely on the axis of rotation of the sprocket-wheel 13. With the arm 40 there is connected a rod 41, whose other end is connected to a lever 42, provided with a roller 44, which is held by a spring 43 against the periphery of a cam-disk 45, mounted on the shaft 31 (Fig. 1).

Back of the sprocket-wheel 13 there is an ejector 46 (Fig. 2) mounted in a guide 54 and whose office it is to eject the bobbins lying in the cases 14 of the magazine. The ejector 46 is actuated by a lever 47, provided with a roller 49, drawn by a spring 48 against the periphery of a cam-disk 50, mounted on a shaft 51. This shaft is furnished with a transmission-gear 52 (Fig. 1) meshing with a second gear 53 mounted on the shaft 31. The ejector 46 has a laterally projecting pin 46' (Fig. 2), which engages in a slot 47' at the top of the lever 47.

The manner of operation of the machine is as follows:—The shuttles to be filled are pushed into the recess 7 of the shuttle-bed part 3 at certain intervals of time, by mechanism of well-known construction, not illustrated in the drawing. At the moment of the shuttle s being pushed into the shuttle-bed, the roller 10 rests on the rail 11, the shuttle-bed part is thus raised and the bottom of the recess 7 lies higher than the bottom of the groove in the shuttle-bed part 4 (Figs. 1 and 6). The contact-surface of the shuttle is located below the edges 8 of the part 3, but does not bear against them. If now the shuttle-bed is pushed in the direction of the arrow (Fig. 1) from the cam-disk 32, the roller 10 leaves the rail 11 and the shuttle-bed part 3 will be drawn down by the action of the spring 12. In this manner the back of the shuttle s enters the groove in the part 4 and the shuttle lies with its contact-surface l against the edges 8 of the part 3, and will be jammed by the spring 12 between the edges 8 and the part 4 (Fig. 7). The slide, with the shuttle held in the shuttle-bed, is now moved toward the bobbin-gripper 16, and a filled bobbin is pushed by the ejector 46 from that case 14 which at the moment is at the level of the guide 29, and is pushed through the guide 29 into the recess 16' of the arm 16 (which acts as bobbin gripper) and is held there by the spring-actuated cover 17, (Figs. 1 and 8). When the slide 2 with the shuttle bed has arrived in the position shown in Fig. 8, the pin 25 will strike the arm 24 and on further motion of the slide will turn this arm and the arm 16 in the direction of the arrow against the action of the spring 27, and the bobbin lying in the bobbin-gripper will thus be brought over the shuttle s lying ready in the shuttle-bed part 3.

Before the bobbin-gripper 16 and the slide with the shuttle-bed have arrived in the position shown in Fig. 10, the pin 23 will strike the roller on the arm 22 and will turn it, so that the lever 20 will be turned against the action of the spring 30 (Figs. 10 and 11) and the bobbin will be knocked from the gripper 16 by the ejector 21, so that the bobbin drops into the shuttle. After the shuttle has been threaded by the hook (not shown in the drawings), which enters through the threading-eye f, the slide returns again under the action of the spring 37, with the stop-pins 23, 25, the shuttle-bed and the threaded shuttle, from the bobbin-gripper into the position shown in Fig. 1, and the bobbin-gripper and the lever 20, will also be brought back by their springs 27 and 30 into their positions, as shown in Figs. 1 and 8. On the return-motion of the shuttle-bed 3, 4 with shuttle into its back-position (shown in Fig. 1) the roller 10 again runs onto the rail 11 and the shuttle-bed part 3 will be elevated. The shuttle, now released again, can then be ejected from the shuttle-bed by mechanism not shown in the drawings.

At each partial rotation of the sprocket-wheel 13 by the cam-disk 45 and coöperating parts 39 to 42, a new bobbin comes in front of the guide 29; and such bobbin by means of the ejector 46 is then pushed through this guide 29 into the bobbin-gripper, is brought by the latter above a new shuttle, lying in the shuttle-bed part 3 and advanced by the slide, and is then pushed from the bobbin-gripper by the ejector 21 so as to drop into the shuttle.

In prior machines for filling embroidery machine shuttles, the shuttles, pushed into a shuttle-bed for the purpose of being held thereby, have been pressed up by means acting from below against the back of the shuttle, and with their contact-surface forced upward against projecting edges on the shuttle-bed. The shuttles, however, in the embroidery machine, rapidly wear down at the contact-surface in the course of time and in consequence,—as hitherto these contact-surfaces have served for determining the height of the shuttle in the shuttle-bed— great deviation in respect to the height of the shuttle threading-eye in the shuttle-bed have resulted, which has caused difficulty with regard to entrance of the threading hook into the threading-eye.

In the machine here described and illustrated, on the other hand, the shuttles are no longer jammed in the shuttle-bed in an upward direction, but in the reverse direction, that is from above downward, and it is not the contact-surface, but the back of the shuttle (which is not subject to friction) that serves to determine the height of the shuttle in the shuttle-bed. Thus even should, owing to wear and tear of the contact-surface of the shuttle, the height from the shuttle-back up to the shuttle contact-surface alter in time, the threading-eye in the shuttle-bed will still occupy the same position, so that the threading-hook can enter the threading-eye with the greatest certainty.

Having now particularly described and ascertained the nature of the said invention and in what manner the same is to be performed, I declare that what I claim is:

1. In a machine for filling embroidery machine shuttles, in combination, a sliding shuttle-bed comprising a stationary part, and a movable part adapted to act on the contact face of the shuttle to press the shuttle toward the stationary part, the back of the shuttle acting as height-determining surface, substantially as described.

2. In a machine for filling embroidery machine shuttles, in combination, a slide, and a shuttle-bed located thereon and consisting of a stationary grooved part secured to the slide, and a recessed part pivoted to the latter and presenting projecting lips above the recess, and adapted to receive the shuttle, and means for pressing the recessed part downward to the grooved part, whereby the shuttle can be jammed between them with its contact-face bearing against said lips and its back against said grooved part, substantially as described.

3. In a machine for filling embroidery machine shuttles, in combination, a slide, and a shuttle-bed located therein and consisting of a stationary grooved lower part secured to the slide, and a superposed recessed part pivoted to the latter and presenting projecting lips above the recess, and adapted to receive the shuttle, and spring means adapted to draw the upper part down upon the lower part and to jam the shuttle between them with its contact-face bearing against said lips and its back pressed against the grooved bottom part, substantially as described.

4. In a machine for filling embroidery machine shuttles, in combination, a slide having an elevated track, and a shuttle-bed located on the former and consisting of a stationary grooved lower part secured to the slide, and a spring-actuated superposed recessed part pivoted to the latter and presenting projecting lips above the recess and adapted to receive the shuttle and clasp it between the two bed parts, and having a roller adapted to ascend said elevated track and release the confined shuttle, substantially as described.

5. In a machine for filling embroidery machine shuttles, in combination, a sliding shuttle-bed adapted to receive a shuttle, a bobbin-magazine, means for ejecting the bobbins in succession from the latter, and an oscillatory bobbin-gripper pivoted to a stationary part and provided with means for seizing and holding the bobbin as they are ejected from the magazine.

6. In a machine for filling embroidery machine shuttles, in combination, a sliding shuttle-bed adapted to receive a shuttle, a bobbin magazine, means for ejecting the bobbins in succession from the latter, an oscillating bobbin-gripper pivoted to a stationary part and consisting of an arm adapted to seize the ejected spool and convey it to the shuttle, and a bobbin-ejector-lever pivoted to the arm and actuated on the bobbin being brought over the shuttle, substantially as described.

7. In a machine for filling embroidery machine shuttles, in combination, a sliding shuttle-bed, a bobbin-magazine, means for ejecting the bobbins in succession from the latter, an oscillating bobbin-gripper pivoted to a stationary part and adapted to seize the ejected bobbin and convey it to the shuttle and a spring-actuated arm, presenting an adjustment-stop and adapted to bear against a stationary part, mounted on the gripper-pivot and adapted to retain the gripper in stationary position during the bobbin seizing operation, substantially as described.

8. In a machine for filling embroidery machine shuttles, in combination, a sliding shuttle-bed, a bobbin-magazine, means for ejecting the bobbins in succession from the latter, and an oscillating bobbin-gripper pivoted to a stationary part and adapted to seize the ejected bobbin and convey it to the shuttle and having a recessed head to accommodate the bobbin, a spring-actuated cover for the recess and a pivotal ejector-arm actuated on the bobbin being brought over the shuttle, substantially as described.

9. In a machine for filling embroidery machine shuttles, in combination, a sliding shuttle-bed, a bobbin-magazine, means for ejecting the bobbins in succession from the latter, and an oscillating slotted bobbin-gripper pivoted to a stationary part and adapted to seize the ejected bobbin and convey it to the shuttle and having a recessed head to accommodate the bobbin, a lever pivoted in the slot, a bobbin-ejector jointed thereto, and a spring-actuated cover capping the recess, above the ejector-head, substantially as described.

In testimony that I claim the foregoing as my invention, I have signed my name in presence of two subscribing witnesses.

MORRIS SCHOENFELD.

Witnesses:
  CAESAR ZOCH,
  CARL GUBLER.